(12) United States Patent
Fatehi et al.

(10) Patent No.: US 6,600,583 B1
(45) Date of Patent: Jul. 29, 2003

(54) OPTICAL INTERNET ROUTER

(75) Inventors: Mohammad Taghi Fatehi, Middletown Township, Monmouth County, NJ (US); Kazem Anaraky Sohraby, Lincroft, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/406,520

(22) Filed: Sep. 28, 1999

(51) Int. Cl.$^7$ ................................................ H04J 14/02
(52) U.S. Cl. ........................ 359/128; 359/139; 359/118; 370/392; 370/390; 370/351
(58) Field of Search ............................. 359/128, 123, 359/109, 125, 117, 137–139, 124, 127, 118, 136; 370/392, 471, 312, 351, 355, 389, 390

(56) References Cited

U.S. PATENT DOCUMENTS

| | | | | |
|---|---|---|---|---|
| 5,488,501 A | * | 1/1996 | Barnsley | 359/137 |
| 5,745,274 A | | 4/1998 | Fatehi et al. | 359/187 |
| 5,786,923 A | * | 7/1998 | Doucet et al. | 359/172 |
| 5,801,863 A | * | 9/1998 | Fatehi et al. | 359/110 |
| 5,892,606 A | * | 4/1999 | Fatehi et al. | 359/175 |
| 5,956,165 A | * | 9/1999 | Fee et al. | 359/118 |
| 6,111,673 A | * | 8/2000 | Chang et al. | 359/123 |
| 6,160,651 A | * | 12/2000 | Chang et al. | 359/123 |
| 6,271,946 B1 | * | 8/2001 | Chang et al. | 359/123 |
| 6,292,464 B1 | * | 9/2001 | Elahmadi et al. | 359/110 |
| 2002/0129166 A1 | * | 9/2002 | Baxter et al. | 709/246 |

\* cited by examiner

Primary Examiner—Nina Tong
(74) Attorney, Agent, or Firm—John A. Caccuro

(57) ABSTRACT

An optical internet router apparatus uses optical tags to send and receive command and response messages between routers of an optical network for establishing, maintaining or changing a packet data connection over the network between a source router and a destination router. The optical router comprises (1) optical tag apparatus for reading a message and writing a message modulated on one or more wavelengths which are used for communicating with another router of a network connection, the control message being modulated onto the one or more wavelengths using a secondary modulation scheme which is different from a primary modulation used to modulate packet data; and (2) a controller responsive to a received read message for controlling a network connection at this router, and for generating a network control message to be written by the optical tag apparatus, the generated message controlling a network connection to said another router.

15 Claims, 11 Drawing Sheets

TABLE 1 - AVAILABLE WAVELENGTH TABLE FOR R2

| PATH (SOURCE-DESTINATION) | WAVELENGTHS AVAILABLE AT | |
|---|---|---|
| | $R_6$ | $R_3$ |
| $R_1-R_4$ | 0 | $\lambda'_W, \lambda'_P, \lambda'_Q$ |
| ... | ... | |
| | | |

FIG. 6

TABLE 2 – DEMAND TABLE

| DEST. \ SOURCE | R1 | R2 | R3 | ·· | ·· |
|---|---|---|---|---|---|
| R1 | – | 0 | 5 | · | · |
| R2 | 3 | – | 2 | · | · |
| R3 | 2 | 0 | – | · | · |
| ⋮ | · | · | · | · | · |

FIG. 7

TABLE 3 – ACTIVE ROUTING TABLE – R2

| FROM | $\lambda$ | TO | $\lambda$ |
|---|---|---|---|
| R1 | $\lambda 1$ | R3 | $\lambda 1'$ |
| R1 | $\lambda 2$ | R3 | $\lambda 2'$ |
| – | $\lambda 3$ | R6 | $\lambda 3$ |

NO-CHANGE MESSAGE

CTR MESSAGE

MULTI-DESTINATION CTR MESSAGE

RESPONSE TO COMMAND MESSAGES

FIG. 13
AVAILABLE WAVELENGTH UPDATE MESSAGE

| 1300 | 1301 | 1302 | 1303 | 1304 | 1305 | 1306 | 1307 |
|---|---|---|---|---|---|---|---|
| MESSAGE ID | UPDATE MESSAGE NUMBER | ADDRESS OF ROUTER THAT IS REPORTING THE UPDATE | ADDRESS OF INTENDED ROUTER TO RECEIVE THIS MESSAGE | NUMBER OF WAVELENGTHS AVAILABLE AT THE ROUTER TO THE INTENDED ROUTER | ID OF FIRST AVAILABLE WAVELENGTH | ID OF SECOND AVAILABLE WAVELENGTH | ... ID OF LAST AVAILABLE WAVELENGTH |

FIG. 14
RESPONSE TO AVAILABLE WAVELENGTH UPDATE MESSAGE

| 1401 | 1402 | 1403 | 1404 | 1405 |
|---|---|---|---|---|
| MESSAGE ID | UPDATE MESSAGE NUMBER | ADDRESS OF THE ROUTER THAT ORIGINALLY REPORTED THE UPDATE | ADDRESS OF SENDING ROUTER | OPTIONALLY REPEAT THE WAVELENGTH UPDATE FIELDS REPORTED IN FIGURE 13 |

OPTICAL INTERNET ROUTER

TECHNICAL FIELD OF THE INVENTION

This invention relates to optical communication systems and, more particularly, to an optical internet router apparatus and operating method which uses optical (message) tags to send and receive commands and responses to/from a source router to establish, maintain, and change an internet path to a destination router.

BACKGROUND OF THE INVENTION

In an all optical internet (OI), signal conversion from optics to electronics should be avoided if possible, and if absolutely necessary it should take place in as few points as possible. Conversion of signals from electronics to optics should also be minimized, except possibly at the source where the original signal entering the network may be in electronic forms. At the destination where the end devices such as PCs and/or internet servers are electronic devices, however, conversion from optics to electronics are unavoidable.

In present routers, when the signal is transported in optical from (such as when received from an optical fiber) it is first converted to electronic form before being processed at the router. Electronic signals (such as Internet's IP packets) are usually buffered and queued for processing at the router (such as for routing and error processing). Finally, the electronics signal is converted back to optics for transmission to the next router in the network. Conversion from optics to electronics is expensive in addition to requiring bulky equipment. More importantly, the network performance such as delay as experienced by the end users is degraded (this as a result of buffering and processing at the routers).

In an optical internet, the conversion from optics to electronics and vice versa should be minimized so that not only the task of information exchange and transport can be accomplished at lower cost, but also to improve network performance. In our pending patent application entitled "Dynamically Assignable Optical Signal Access Control Apparatus," filed on Oct. 16, 1998, wavelength routing and performance optimization is accomplished through periodic observation of buffer contents at the multiplexer. In that invention, multiple wavelengths can be allocated on a path so that conversion back to electronics in the network is minimized and, furthermore, network resource usage is optimized through proper utilization of wavelengths among source and destinations.

A straightforward method for dealing with performance issues in an internet is for each router/cross-connect to have a dedicated wavelength to all other routers/cross-connects (possible destinations for traffic from each router). Using this approach, and coupled with the technique proposed in our previously referenced patent, performance problems can be minimized. However, currently only a few (in the order of 10–100) wavelengths can be wavelength division multiplexed (WDM) on an optical fiber. If WDM was not a limitation, theoretically it would be possible to establish a dedicated wavelength between all source/destination router pairs in the network. For example, in a network with say 100 routers, $100 \times (100-1)/2 = 4950$ wavelengths would be required to connect each router with all other routers of the network. For a large network (such as consisting of possibly thousands of routers) the number of wavelengths at each router (or cross-connect) rises rapidly and currently not feasible to be implemented, if wavelength re-use is not permitted.

What is needed is an improved optical packet routing technique that does not require the use of dedicated source/destination wavelengths.

SUMMARY OF THE INVENTION

In accordance with the method and apparatus of our invention, an optical internet router apparatus uses optical tags to send command and response messages between routers of an optical network for establishing, maintaining or changing a packet data connection over the network between a source router and a destination router. The optical router comprises (1) optical tag apparatus for optically reading a message and writing a message modulated on one or more wavelengths, which are used for communicating with another router of a network connection, the control message being modulated onto the one or more wavelengths using a secondary modulation which is different from a primary modulation used to modulate packet data; and (2) a controller responsive to a received read message for controlling a network connection at this router, and for generating a network control message to be written by the optical tag apparatus, the generated message controlling a network connection to said another router. The controller is also responsive to a read status response message from the optical tag apparatus, for determining a network connection status at said another router, and can generate a local status response message to be written by the optical tag apparatus to indicate a status at this router.

According to one feature, the router uses messages such as (1) a "no-change" message indicating that no change is required in the network connection, (2) a Command To Reassign (CTR) message identifying a change to be made in the network connection, and (3) a response message indicating a response to a previously received message. According to another feature, messages may be sent (1) periodically based on a predetermined time interval, (2) continuously, and (3) in response to a predefined condition at a router in the network.

BRIEF DESCRIPTION OF THE DRAWINGS

FIG. 6 shows a Demand table used at an optical router controller;

FIG. 7 shows an Active Routing table used at an optical router controller;

FIG. 13 shows the format for a Available Wavelength Update message; and

FIG. 14 shows the format for a response to the Update message of FIG. 13.

In the following description, each item or block of each figure has a reference designation associated therewith, the first number of which generally refers to the figure in which that item is first described (e.g., 101 is first described in FIG. 1).

DETAILED DESCRIPTION

Figure 1:
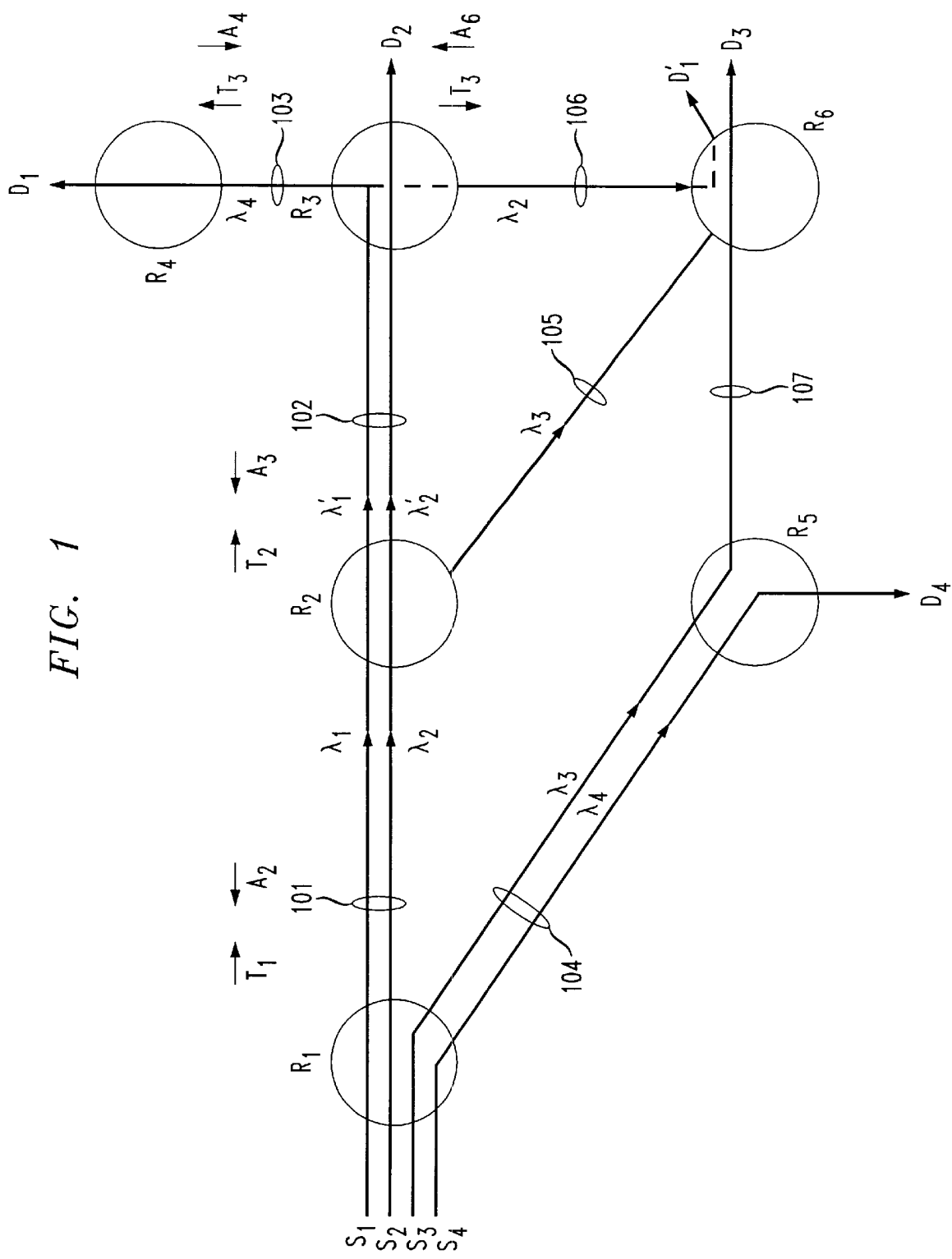
FIG. 1 shows an illustrative block diagram of an optical network in which the present invention may be utilized.

Shown in FIG. 1 is an illustrative block diagram of an optical network (e.g., optical internet) in which the present invention may be utilized. As shown, the network includes optical routers/cross-connects (hereinafter routers) R1–R6 interconnected via optical links 101–107. Depending on the traffic between routers some of the optical links need only one wavelength while others utilize multiple wavelengths to carry the traffic. Note that for a particular route, e.g., source S1–destination D1, the same wavelength may not be utilized in all of the optical links along the route S1–D1. As shown, wavelength $\lambda_1$ is used over link 101, $\lambda_1'$ used over link 102, and $\lambda_4$ is used over link 103. At a router, the switching of one wavelength to another different wavelength is done in a well known manner (for example by using optical transponders). This does not require conversion of signal carried in a wavelength from optics to electronics, and vice versa. It can be performed in optical domain.

In prior art applications, a packet destination address is included in each optical packet on each wavelength that is generated at a source router. Based on network traffic among the various source and destination pairs, e.g., S1–D1, wavelengths are "tunneled" through intermediate routers R1, R2, R3, and R3 to complete the route S1–D1. As shown in FIG. 1, several tunnels are generated at the source router R1 to enable path connections from sources S1, S2, S3, and S4 to destinations D1, D2, D3, and D4, respectively, which are located on routers R4, R3, R6, and R5, respectively.

Figure 2:
FIG. 2 shows the flow of optical packets over the optical links in prior art optical networks.

With joint reference to FIGS. 1 and 2, in prior art routers the destination address is checked in each packet P1–PM of FIG. 2 which are carried in a wavelength to determine the routing of the packet. Since the destination address is modulated onto the wavelength along with the packet, checking the destination of a packet required conversion of the optical packet to an electrical packet signal. Once the packet destination is known, in a well known manner, router R2 looks-up in a table or determines using an algorithm the next router that the packet should be directed to reach destination D1. Thus, at router R2, the destination of packets originating from source S1 are checked and since the destination is D1, they are tunneled from optical link 101 to optical link 102. Note that router R2 algorithm may use different criteria to select the actual path 102 to R3 from the several paths 102 to R3 and 105 to R6/106 to R3 that can be utilized between router R2 and R3. In our example, the packets from source S1 are converted to an electrical packet signal at router R2, the destination and route determined and then the packet is converted back to an optical packet signal and routed by router R2 over link 102 to router R3. Similar packet processing occurs at router R3 to route the packet to its destination R4. Thus, the prior art optical networks required that each optical packet be converted to an electrical signal for processing at each router along the source to destination path.

In accordance with the present invention, we utilize an "optical message tag" on the carrier wavelength which includes packet destination information associated with a group of packets which are carried on a wavelength. Optical tagging is described in U.S. Pat. No. 5,745,274, issued to M. T. Fatehi et al on Apr. 28, 1998, which is incorporated by reference herein. In that patent, optical tags are formed by modulating individual optical carriers (e.g., lasers) with a unique identifier signal (i.e., frequency tones) that can be readily read, modified or written. While this patent describes the use of a frequency tone as a subcarrier for carrying message tags, under certain conditions, one could modulate the massage tags directly on the envelopes of the data carrying wavelengths without using subcarrier tone frequencies. The optical message tags are modulated with various types of maintenance information which can monitored by at any point along the network.

In accordance with the present invention, optical tagging is associated with a group of packets and used for signaling between routers for controlling the routing of that group of packets over an optical network of FIG. 1. The superimposed "tag" can be removed in the optical domain (in a process called untagging) without conversion of the signal carried within the wavelength to electronics. More importantly, a new tag can be generated in the optical domain and applied at the intermediate routers/cross-connects without conversion to electronics. Thus, since the observation and control of packet channels is performed in optics rather than electronics, it is accomplished with reduced delay and at a decreased cost. Consequently in our network, conversion of the optical signal to an electronic signal is avoided.

Figure 3:
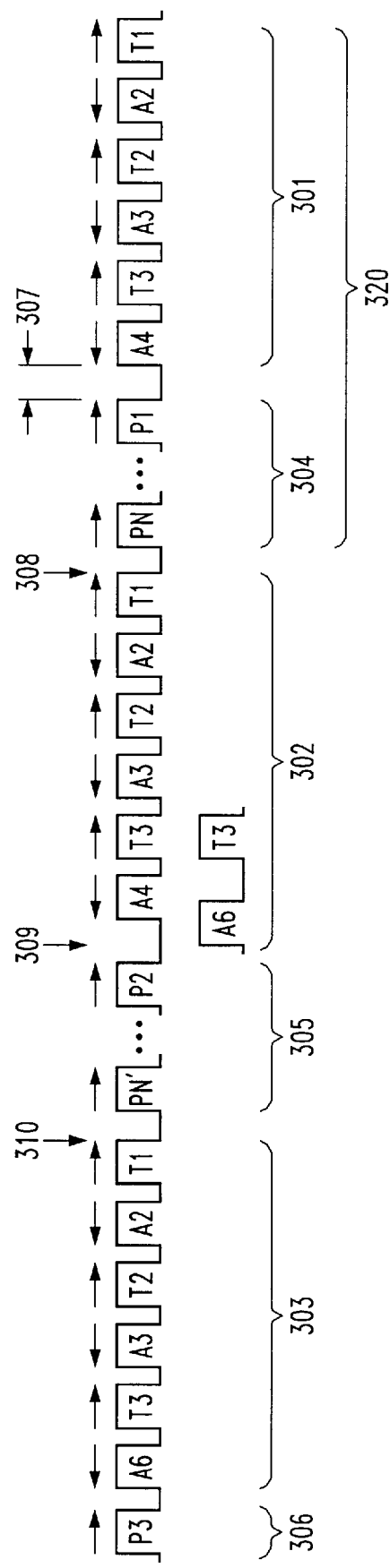
FIG. 3 shows, in accordance with the present invention, the use of an optical message tag associated with a group of packets for determining packet routing.

With reference to FIG. 3, there is shown illustrative optical tags (hereinafter message tags) 301, 302 and 303 which are used to control the routing of packet groups carried on different wavelengths by controlling the cross-connection at router of wavelengths that carry the packets 304, 305 and 306, respectively. The size of the packet groups may range from 50 packets up to thousands of packets, depending on packet traffic flow and how often the destination router for a connection is changed. With joint reference to FIGS. 1 and 3, we assume the message tags 301, 302 and 303 are used to control the connection initially established between source S1 and destination D1 which is then changed to a connection between source S1 and destination D1'. Note, that the particular routers selected to establish the connection from source router S1 to destination router R4 is done using well known route selection algorithms utilized at each of the routers of FIG. 1. As will be discussed in later paragraphs, communications between the source router R1 and the other routers of the network (or between other routers of the network) may be done at predefined times and/or in response to predefined network conditions (e.g., a change of the destination of a connection). In our example, the source router R1 sends a tag command message T1 (where T indicates a command transmission and 1 the router transmitting the command) to a downstream router R2, indicating the routing of the packets P1–PN to destination router R4. The type and format of the various command and response messages (shown in FIGS. 8–11, 13–14) are also described in later paragraphs. Router R2 responds with a response or acknowledgement A2 (where A indicates a response transmission and 2 the router transmitting the response) to source router R1. Thereafter, router R2 sends a command message T2 to the next downstream router R3, which sends a response A3 back to router R2. Router R3 then sends a command message T3 to the next downstream router R4. Since R4 is the destination router, it sends a "path complete" response A4 that is communicated back through all of the routers of the path S1–D1, i.e., through R3, R2, to source R1. This response indicates that the path is established and that the transmission of the group of packets 304 can proceed from source router R1 to destination router R4 over the established path S1–D1. According to another aspect of the invention, the group of packets 304 can be made to follow along as the connection is established from router to router. It should be noted, that the time interval 307 between the commands/response 301 T1 and the first packet P1 of the group 304 should be long enough to enable all of the routers R1, R2, R3, and R4 of a path to complete the cross-connection of all wavelengths between source R1 and destination R4 which constitutes routing of a path.

We now assume that at time 308 source S1 makes a change in the destination from D1 to D1' for the next group of packets 305. It should be noted that the destination change message tags, T1, A2, etc. shown in 302, could co-exist (overlap) with part of the data packets 304 because the message tag use a small envelope modulation of the wavelength signal that does not interfere with the data packet modulation of the wavelength carrier. So one can envision that during the transmission of packets 304, the message tags 302 can also be communicated. Such a technique would reduce the idle time between data packet transmissions, e.g., 304 and 305. For clarity of illustration in FIG. 3, we assume that the destination change message tags 302 do not overlap the data packet transmission 304. In this situation, source router R1 sends a tag command message T1 to router R2 indicating the change of routing of packets P1–PN from destination router R2 to R6. Router R2 responds with a response or acknowledgement A2 to source router R1. Thereafter, router R2 forwards the command message T2 to the next downstream router R3, which sends a response A3 back to router R2. At router R3, the change in destination from D1 to D1' means a path change needs to be made from router R4 to router R6. To accomplish this path change router R3 sends the command message T3 to both router R4 and router R6. The command message T3 is sent to router R6 using an available wavelength, e.g., λ2. Router R6 interprets the change of destination in the received command as a request to establish a wavelength, e.g., λ2 path to router R3. Router R4 interprets the change of destination in the received command as a request to open the wavelength λ4 path to router R3. Both routers R4 and R6 then return response messages A4 and A6 to router R3, by the time 309. Note, illustratively, we showed that router R6 took longer to process the command and to return a response. At time 309, both "path complete" responses A4 and A6 have been received by router R3 and forwarded through router R2 to source router R1. Router R1 knows not to send the next packet group 305 until it receives a response A6 from both the new destination router R6 and response A4 from the old destination router R4. After receiving the response A4 from router R4, source router R1 knows it can proceed to send the group of packets 305 from source router R1 to new destination D1' at router R6 over the new established path S1–D1'.

If we assume that source S1 does not make any change in the path S1–D1', then at time 309 the next series of command and response messages T1/A2, and T2/A6 proceed in the same manner as described above. Thereafter, the next group of packets 303 are sent to destination D1' at router R6.

Figure 8:
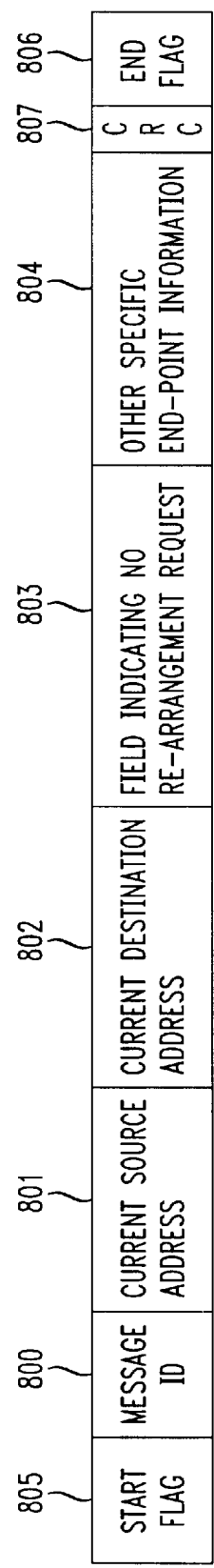
FIG. 8 shows the form at for a "no-change" command optical message tag.
Figure 9:
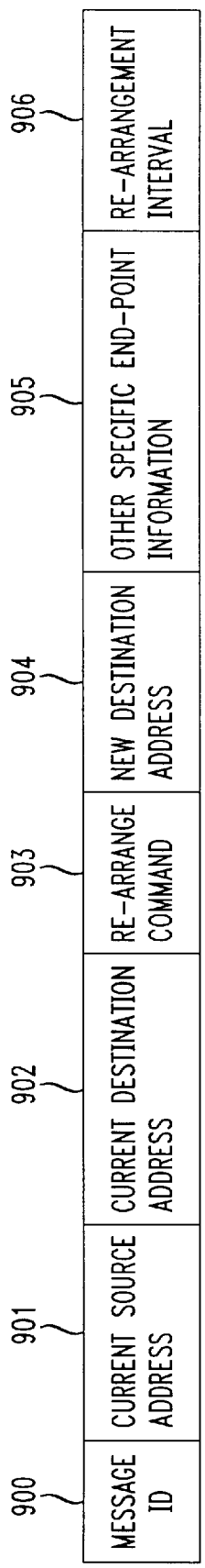
FIG. 9 shows the format for a Command-To-Rearrange (CTR) message.
Figure 10:
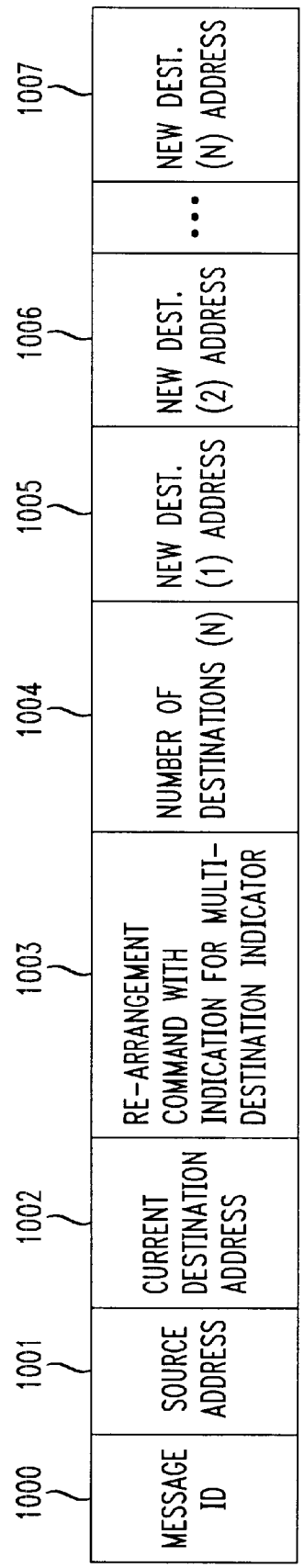
FIG. 10 shows the format for a Multiple Destination CTR message.

The command message tags (e.g., T1, etc.) described in the previous paragraphs can be a "no change" command message, shown in FIG. 8; a "Command to rearrange" (CTR) message, shown in FIG. 9; or a "Multi-Destination" command message, shown in FIG. 10. With reference to FIG. 8, the format of the "no change" command message tag is shown to include a Message Identifier(ID) 800, a Current Source (router) Address 801, a Current Destination (router) Address 802, a "No Re-Arrangement Requested" field 803, and Specific End-Point Information 804. These command message tags may be sent on a continuous, periodic, or only when needed (an exception) basis. When the command message tags are sent on a continuous basis they are sent over a previously assigned optical wavelength (as a "no change" message necessary for maintaining network configuration). Optionally a Start Flag 805 and an End Flag 806 is needed to determine the start and end, respectively, of a command message tag. In an alternate embodiment, this message tag is transmitted periodically so that the intermediate Router Controllers (RCs) can determine whether a change has occurred. A third alternative embodiment is to transmit a command message tag only on an exception basis (such as when routing the current wavelength is to be changed to a different end point). Thus, operating on a exception basis means that only CTR or Multi-Destination CTR message tags are sent indicating that a rearrangement of the network is requested. A Start 805 and End 806 Flag is useful when the command message tags are sent on a periodic or an exception basis to facilitate the detection of the messages. An error detecting field 807 may also be utilized in the command messages.

A CTR message tag is shown in FIG. 9 to include a Message ID 900, a Current Source (router) Address 901, a Current Destination (router) Address 902, a Re-Arrangement field 903, a New Destination (router) Address 904, Specific End-Point Information 905, and a Re-Arrangement Interval 906. Optionally, a priority field may be included in the field 905 to indicate if this re-arrangement should take priority over other requests.

A Multi-Destination message tag is shown in FIG. 10 to include a message identifier 1000, a Current Source (router) Address 1001, a Current Destination (router) Address 1002, a Multi-Destination Re-Arrangement field 1003, the Number of Destinations 1004, Destination Addresses 1005–1007 and associated wavelength IDs. A Multi-Destination message is used in applications where it may be necessary at a given source to send traffic onto the same wavelength which is destined for different destination routers. In this case, instead of generating multiple CTR messages, one for each wavelength between the two routers, a multi-destination tag is generated. The tag is subsequently regenerated at a router where the next routers use different wavelengths. In this case, the Multi-destination message tag, in addition to the source address and the command field would also carry multiple destination addresses. Optionally, at the intermediate router only such wavelengths are converted back from optics to electronics, demultiplexed, and after separating the various destinations traffic, they are multiplexed again and converted to optics for transmission onto a wavelength to the next router. Note that depending on the availability of wavelengths at the different routers along the path to the destination router, such O/E/O conversion may take place several times before reaching the final destination. This is the only case where conversion from O to E and back to O may be necessary.

Figure 11:
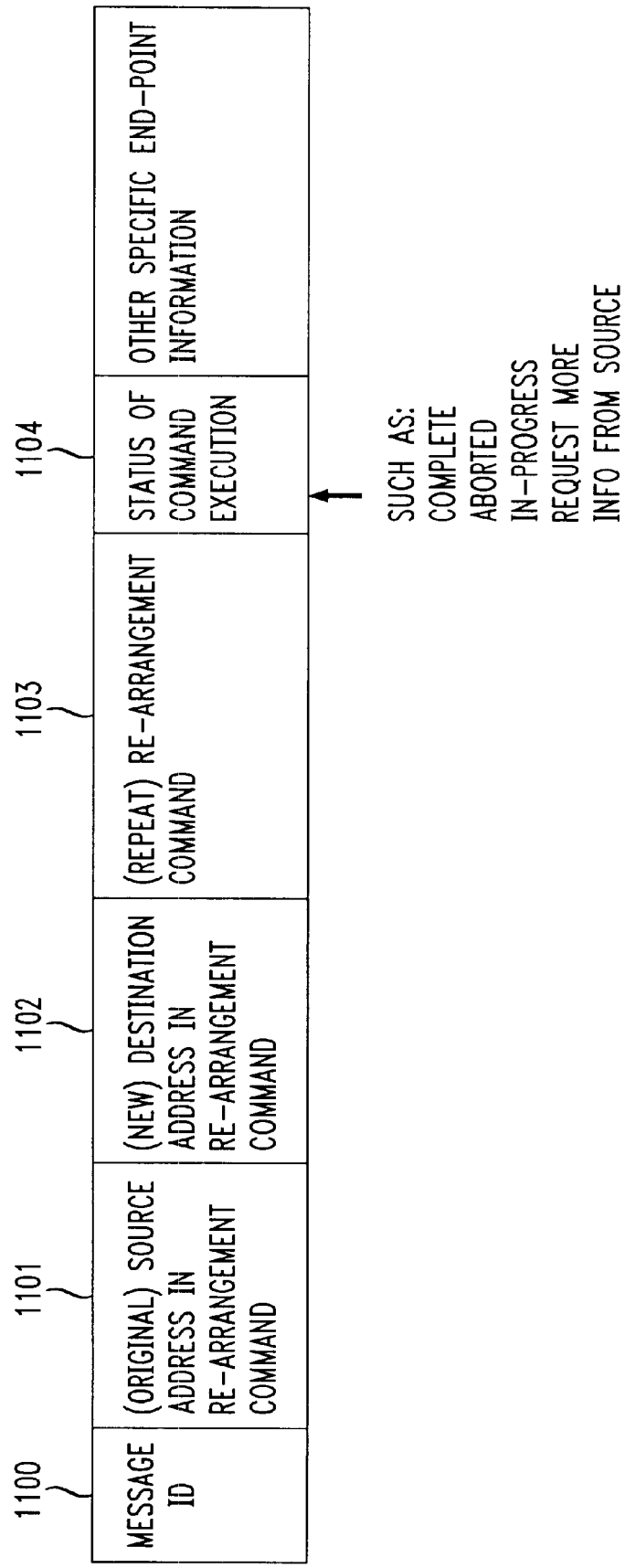
FIG. 11; shows the format for a response to the command messages of FIGS. 8 to 11.

The format of a response tag is shown in FIG. 11. As shown it includes a message ID 1100, an Original Source (router) Address 1101, a New Destination (router) Address 1102, a Repeat Command 1103, an Execution Status 1104, and Specific End-Point Information field such as New Destination (router) Address 1005. The Execution Status 1104 may include information fields such as (1) execution complete, (2) execution aborted, (3) execution in progress, and (4) more information requested from the source router. Later paragraphs will describe the particular use of the various command and response message tags in the operation of the present invention.

Figures 4, 5:
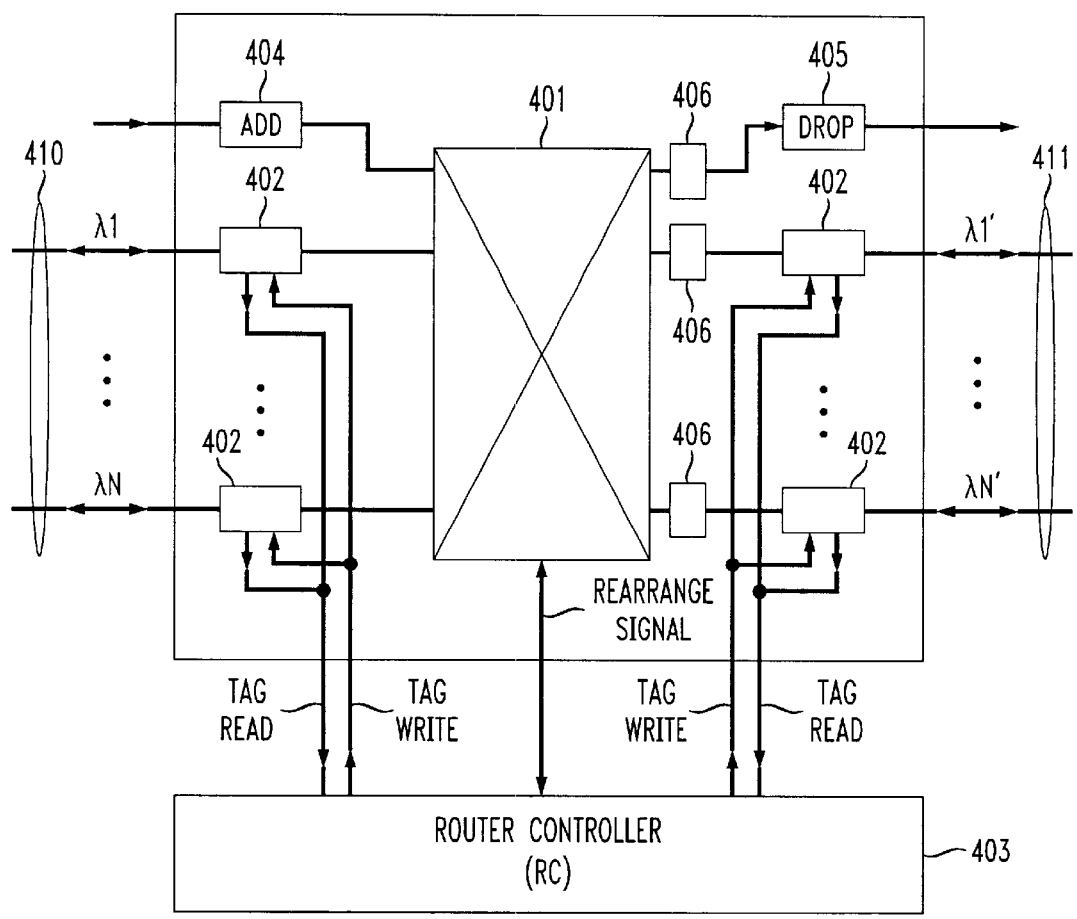
FIG. 4 shows an illustrative block diagram of an optical router useful in describing the operation of the present invention.
FIG. 5 shows an Available Wavelength Routing table used at an optical router controller.

As shown in FIG. 4, an intermediate router illustratively consists of an optical cross-connect 401, tag read/write apparatus 402 on each wavelength entering and exiting both sides 410 and 411 of cross-connect, wavelength changers 406 for changing wavelengths according to the available wavelength table, and a router controller 403 that controls the operation of the router. With joint reference to FIGS. 1 and 4, the cross-connect 401 is re-arranged when there is need for creating new connections or wavelength "tunnels" to particular router destinations. The wavelengths which carry these tunnels are usually connected to multiplexers and/or end point routers with optical/electronic interfaces. At intermediate routers, such as R2, where wavelengths pass through without packets being added or dropped, do not require buffers. Moreover, in accordance with the present invention, at such intermediate router R2 there is no conversion of the optical (O) signal to an electrical (E) signal for processing and re-conversion back to an optical signal.

In practice, an intermediate router may be intermediate (e.g., do not perform O/E and E/O conversion) with regard to certain wavelengths and can act as a source or destination router for other wavelengths. As shown in FIG. 1, router R5 is an intermediate router with regard to wavelengths $\lambda 3$ and acts a destination router for source S4 which uses wavelength $\lambda 4$ to send packets to the destination D4 at router R5. When the router R5 of FIG. 4 is used as a destination router, a Drop unit 405 is used, in a well known manner, to drop an optical signal from an existing wavelength via the cross-connect 401, under control of controller 403. The Drop unit 405 may also include demultiplexers to demultiplex traffic and distribute it to various connected circuits.

When a router, e.g., R1 of FIG. 4 is used as a source router, an Add unit 404 is used, in a well known manner, to add a source signal (after conversion to optics) to an existing or new wavelength via the cross-connect 401, under control of controller 403. Each source router multiplexes traffic to the various destination routers. The multiplexed traffic is then converted to optics and transported using one or more wavelengths. The source router also generates message tags on the wavelength(s) using tag read/write apparatus 402. The tag is read at the intermediate routers and depending on the destination address embedded in the tag the router controller establishes the path to the next router en-route to the destination. When the source router has traffic to another destination and the "tagged" wavelength becomes available, the source router "untags" the fields and "tags" the wavelength with the new destination address (and other relevant information) on the wavelength.

Figure 12A:
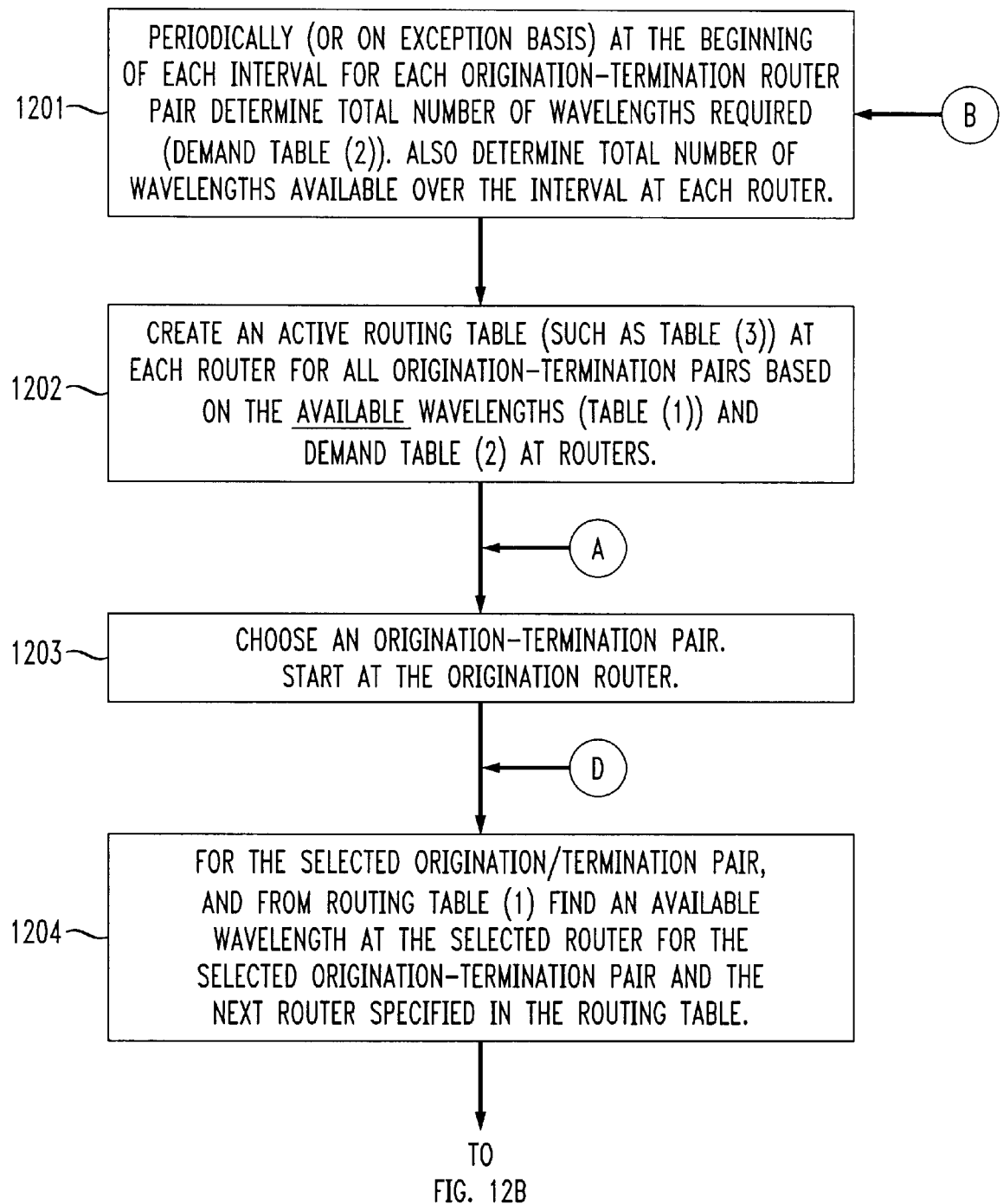
FIGS. 12a–12c show, in accordance with the present invention, an illustrative flow chart describing the operations of the routers of the optical network of FIG. 1.

In accordance with the operation of the present invention, the operation of controller 403 of router of FIG. 4 is described by the illustrative flow chart shown in FIG. 12, which will be discussed in later paragraphs. The controller 403 controls the establishing, maintaining and changing of connections at the router, in response to commands from an external source, e.g., S1, or another router. The controller also sends a variety of messages as shown in FIGS. 8–11 and 13–14. The controller at each router keeps track of various source, destination, and wavelength assignments using a variety of tables shown in FIGS. 5–7.

One table is the Available Wavelength table, Table 1 of FIG. 5, which keeps track of the wavelengths available to all of the routers that connect to a particular router. Thus, as shown in Table 1 of FIG. 5, for illustrative router R2, the source-destination path R1–R4 is shown to have zero wavelengths available to router R6 and several wavelengths available to router R3. Note that Table 1 does not guarantee that once packets reach router R3 a wavelength will be available to the next router R4. This is only determined when the message tag arrives at router R3. Note also that only routers that may be used to interconnect the Source-Destination path S1–D1, i.e., R1–R4 are listed in Table 1. In a well known manner, an algorithm at controller 403 of router R2 is used to determine which routers are to be considered for establishing the routing path source-destination path S1–D1 using routers R1–R4.

Another table used by controller 403 is the Demand table, shown as Table 2 in FIG. 6. As shown illustratively for router R1, the Demand table keeps track of the number of wavelengths required to be used for a particular source—destination router. For example, for the source—destination S1–D1 path shown in FIG. 1, the table shows the path using source router R1 and destination router R4 and that total of 3 wavelengths are needed. Similarly, the table lists the other source/destination router pairs used for the source/destination paths of FIG. 1.

Table 3 shown in FIG. 7, is an Active Wavelength Routing table which keeps track of all wavelengths that pass through the router as currently configured and can be used for packet transmission. Thus, illustratively, for router R2, the table shows that the wavelength $\lambda 1$ is being used for upstream connections to router R1 and that the wavelength $\lambda 1'$ is being used for downstream connections to router R3.

The following paragraphs describe how the Demand table, Table 2 of FIG. 6, and the available wavelength information provided by an Available Wavelength Update message, shown in FIG. 13, are used to generate data for the Active Wavelength Routing table, Table 3 of FIG. 7. The Demand table for a given time interval (310 of FIG. 3) indicates by originating-terminating router pair, the bandwidth (or number of wavelengths) required for that interval between the origination-termination pair. This demand may traverse only one optical link which directly interconnects the origination-destination routers (e.g., S4–D4 uses only link 104 in FIG. 1), or may traverse several links and routers (e.g., S1–D1 of FIG. 1). The exact path or route consists of routers and wavelengths that are identified in a route determination step (e.g., step 1204 of FIG. 12). The technique used to determine the route for each origination-termination router pair (and the routers that comprise the route) is well known and may, illustratively, be performed by routing algorithms. Since these route determination techniques are not the subject of the present invention, they are not further discussed hereinafter.

As shown in FIG. 13, the Available Wavelength Update message includes a Message ID field 1300, an Update Message Number 1301, the Address of the Updating Router 1302, the Address of the Intended Router to receive this message 1303, the Number of Wavelengths available from the sending router to the intended router 1304, and the IDs of the first, second and last available wavelengths 1305–1307. Upon determining the idle wavelengths at a router, update messages are sent periodically by a router to its adjacent routers.

An Update Response message, shown in FIG. 14, is sent by adjacent routers in response to a received Available Wavelength Update message. The Update Response message includes a message ID 1401, an update message number 1402, the address of Updating router 1403, the address of the sending router 1404, and a repeat update message request 1405.

Using information from the Available Wavelength Update message, each router is able to generate the Available Wavelength table, Table 1 of FIG. 5. Each router can then select available wavelengths that can be used to satisfy wavelength demands by the various origination-termination route. Once a wavelength is assigned to a origination-termination route, that wavelength assignment information is entered in the Active Routing table, Table 3 of FIG. 7, and deleted from the Available Wavelength table, Table 1 of FIG. 5. The Available Wavelength Update message is then sent to adjacent routers.

With joint reference to FIGS. 1, 3, 4 and 12 we describe the operation of the present invention. In step 1201, on a periodic or exception event (as needed basis) at the beginning of each interval, 320 of FIG. 3, for each origination-termination router pair, total number of wavelengths required is determined. One example of an exception basis may be in response to a source, e.g., S1 requesting that the old destination, e.g., D1, be changed to a new destination, e.g., D1. This data is stored in the Demand table 2 of FIG. 6. Also determined is the total number of wavelengths available at each router. In step 1202, this data is stored in an Available Wavelength table, i.e., Table 1 of FIG. 5, created for each router (or cross-connect) for all origination-termination pairs based on the available wavelengths at a router and Demand table, i.e., Table 2, wavelength demands. In step 1203, starting at the origination router, controller 403 chooses an origination-termination pair for processing. Controller 403 chooses an origination-termination pair for processing periodically or on an exception event. In step 1204, using Table 1 an available wavelength is searched for at the present router to extend the connection to the next downstream router along the route being established between the origination-termination pair.

Figure 12B:
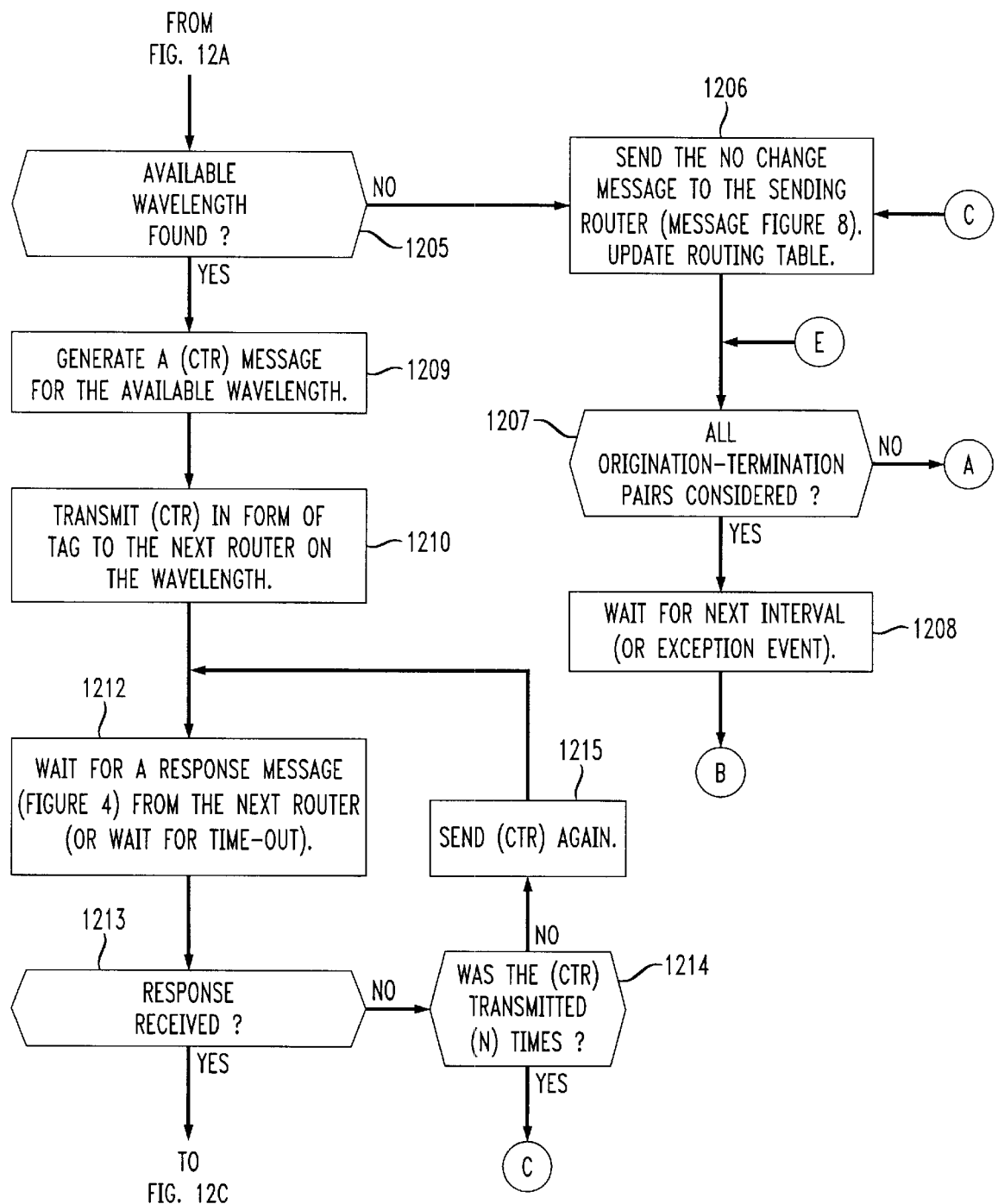
Figure 12C:
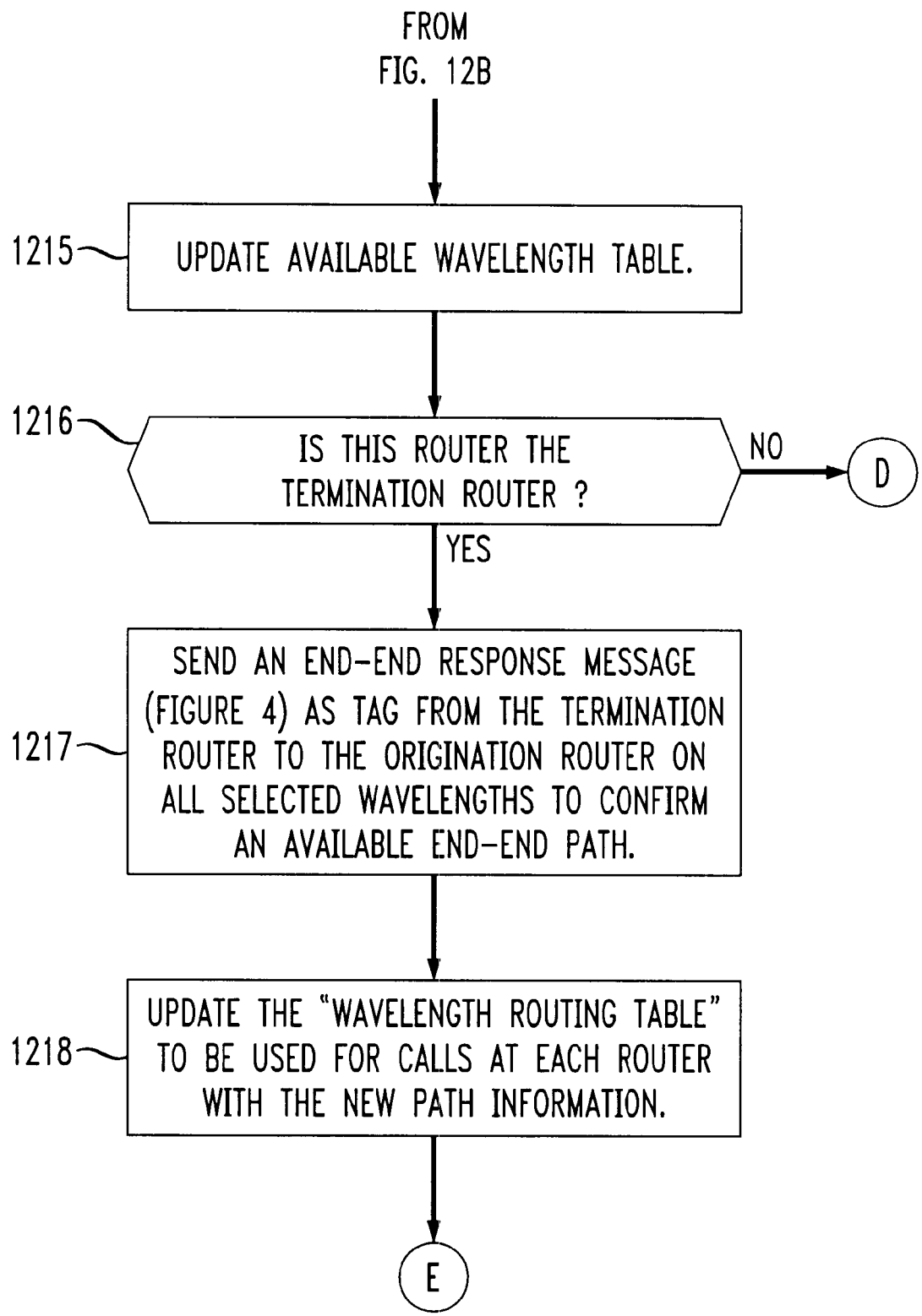

In step 1205 of FIG. 12b, it is determined whether an available wavelength has been found at the router. If it not found, then step 1206 is performed. In step 1206, the controller does not change the Available Wavelength table, Table 1 of FIG. 5, and a "no change" message tag (FIG. 8) is sent to the next downstream router. If the next router does not respond, then that router entry in Table 1 is set to a special value to indicate that the path to that router is down. In step 1207, it is determined if all origination-termination pairs have been considered. If they have not all been considered, then control returns to step 1203 where the next origination-termination pair is considered. We again assume that the loop sequence of steps 1203, 1204, 1205, 1206, 1207 to 1203 are followed for all origination-termination pairs. Then following the last origination-termination pair, step 1208 will follow step 1207. In step 1208 the process is terminated at the controller 403 until the next interval (or exception event) starts the process again.

Returning to step 1205, we now assume that an available wavelength is found for the first origination-termination pair. Step 1209 is then performed, generating a CTR message tag (FIG. 9) for the available wavelength. The CTR message is tagged onto the current wavelength. As previously noted, in FIG. 9, the CTR message conveys the re-arrange command 903 in addition to the address of the old 902 and new 904 destination router. The next downstream router reads the CTR message and forwards it to Router Controller (RC), 403 of FIG. 4. At the Router Controller, in a well known manner a routing algorithm selects the next downstream router needed to establish a connection to the new destination router (e.g., D1'). If the algorithm determines that the same next router is needed to reach the new destination (D1'), then no action is needed at the present router. However, if the algorithm determines that a new next router is needed to reach the new destination (D1') then the router controller checks the Available wavelength table, Table 1, to determine whether a wavelength exists to reach the new next downstream router. Assuming it does, the Demand table, Table 2 of FIG. 6, is updated.

In step 1210, the CTR tag is sent to the next downstream router (the new one or the previous one as determined by the routing algorithm) on the wavelength identified in the routing Table 1. In step 1212, the sending router awaits a response from the next router or times out. In step 1213 if there is no response is received (a time out occurs) then in step 1214 it is determined if the CTR tag has been sent N times (where N is some predefined number). If it has not, then in step 1215 the CTR message tag is again sent to the next downstream router and step 1212 is performed. In step 1214, if the CTR message tag has been sent N times, then control returns to step 1206.

If a response is received following step 1213, then in step 1215, the Available Wavelength table, Table 1, is updated to remove that wavelength from the available wavelengths listed for that next router. Note, when the path has been finally established through all of the routers then that path will be listed in the Active Routing Table 3. In step 1216, it is determined if this router is the termination router. If it is not, then control returns to step 1204. If it is, then step 1217 is performed. In step 1217, since the router is the termination router it can signal all of the routers on the path, using an end-end response message (FIG. 11), indicating that a completed path has been established. In step 1218, each router on the path updates its Active Routing Table 3 (FIG. 7). Thus, the Active Routing Table 3 at each router is updated identifying the path that has been finally established from the originating router through all of the routers to the destination router. Thereafter control then returns to step 1207. Note, since the path is now complete for this origination-destination pair, the origination router can now send source packet data (P1–PN) along the completed connection path or route through the intermediate routers to the destination router and outputted to the destination location.

While the network route controlling (or reconfiguration) signaling has been described as being transported over an optical network using message tags, the reconfiguration signaling can also be accomplished over a separate path (e.g, a Signaling System 7 (SS7) path or a Common Channel Interoffice Signaling (CCIS) path). Thus, what has been described is merely illustrative of the application of the principles of the present invention. Other methods and arrangements can be implemented by those skilled in the art without departing from the spirit and scope of the present invention.

What is claimed is:

1. An optical router for use in an optical packet network, said router comprising optical tag apparatus for reading a command message received at this router from another network optical router and writing a response message which is transmitted back to said another router, these messages being a second modulation on one or more wavelengths which are used for packet data communications which pass through this router, the second modulation being different from a primary modulation used to modulate packet data onto the one or more wavelengths; and a controller
responsive to a read network connection control command message from the optical tag apparatus, for controlling a packet data network connection at this router, and for generating a network control message to be transmitted by the optical tag apparatus, said generated message controlling a network connection to said another router.

2. The optical router of claim 1 wherein said controller
is responsive to a read status response message from the optical tag apparatus, for determining a network connection status at said another router, and generating a status response message to be written by the optical tag apparatus, said status response message indicating a status at this router.

3. The optical router of claim 1 wherein the controller generates one or more of a group of network control messages including
   (1) a no-change message indicating that no change is required in the network connection,
   (2) a command to reassign (CTR) message identifying a change to be made in the network connection, and
   (3) a multi-destination CTR message identifying multiple destination routers to be connected after a change is made in the network connection.

4. The optical router of claim 3 wherein each CTR message includes a source router address, a destination router address, a re-arrange command, and a new destination address.

5. The optical router of claim 4 wherein each CTR message further includes a wavelength identification and a re-arrangement interval.

6. The optical router of claim 1 wherein the controller is responsive to one or more of a group of network control messages including
   (1) a no-change message indicating that no change is required in the network connection,
   (2) a command to reassign (CTR) message identifying a change to be made in the network connection, and
   (3) a multi-destination CTR message identifying multiple destination routers to be connected after a change is made in the network connection.

7. The optical router of claim 1 wherein each network control message includes a source router address and a destination router address of the network connection.

8. The optical router of claim 1 wherein the read and written messages control a network connection for a plurality of packets.

9. The optical router of claim 8 wherein the read and written messages may overlap a plurality of packets being sent over the network connection.

10. The optical router of claim 1 wherein the read and written messages are sent based on one or more of a set of criteria including
    (1) periodically based on a predetermined time interval,
    (2) continuously, and
    (3) in response to a predefined condition at a source router of the network connection.

11. The optical router of claim 1 wherein the read and written messages are initiated at a source router of the network connection and are sequentially processed and forwarded by each router of the network connection.

12. The optical router of claim 1 wherein the controller sends an available wavelength update message to one or more adjacent routers identifying available wavelengths that link to each adjacent router.

13. The optical router of claim 12 wherein the controller receives a response message from each adjacent router in response to the sent available wavelength update message.

14. A method of operating an optical router for use in an optical packet network, comprising the steps of:
    optically reading a command message received at this router from another network router and writing a response message which is transmitted back to said another router, these messages being a second modulation on one or more wavelengths which are used for packet data communications which passes through this router, the second modulation being different from a primary modulation used to modulate packet data onto the one or more wavelengths;
    in response to a read network connection control command message from the optical tag apparatus, for controlling a packet data network connection at this router, and
    generating a network control message to be transmitted by the optical tag apparatus, said generated message controlling a network connection to said another router.

15. An optical packet network including a source router for sending data packets to another router of the network, wherein
    said source router comprises
    optical tag apparatus for optically reading a response message received at this router from another network router and writing a command message which is transmitted to said another router, these messages being a second modulation on one or more wavelengths which are used for packet data communications with said another router, the second modulation being different from a primary modulation used to modulate packet data onto the one or more wavelengths and
    a controller
    for generating and sending a network connection control command message to be transmitted by the optical tag apparatus, said generated message being a message addressed to said another router for controlling a network connection to said another router and
    said another router comprises
    optical tag apparatus for optically reading a said network connection control command message from said source router and writing said response message which is transmitted back to said source router, these messages being a second modulation on one or more wavelengths which are used for packet data communications with said source router, the second modulation being modulated onto said one or more wavelengths using a secondary modulation which is different from a primary modulation used to modulate packet data onto the one or more wavelengths and
    a controller, responsive to a read network connection control command message from said source router, for generating said response message to be transmitted by the optical tag apparatus, said response message being addressed to said source router and reporting a status at said another router.

* * * * *